US012196441B2

(12) United States Patent
Huang

(10) Patent No.: US 12,196,441 B2
(45) Date of Patent: Jan. 14, 2025

(54) INTELLIGENT CONTROL SYSTEM FOR ELECTRIC CURTAIN

(71) Applicant: SAN HSIN PLASTECH CO., LTD., Taoyuan (TW)

(72) Inventor: Shu-Yuan Huang, Taoyuan (TW)

(73) Assignee: SAN HSIN PLASTECH CO., LTD., Taoyuan (TW)

( * ) Notice: Subject to any disclaimer, the term of this patent is extended or adjusted under 35 U.S.C. 154(b) by 625 days.

(21) Appl. No.: 17/567,157

(22) Filed: Jan. 3, 2022

(65) Prior Publication Data

US 2022/0221183 A1 Jul. 14, 2022

(30) Foreign Application Priority Data

Jan. 13, 2021 (TW) ................................ 110101218

(51) Int. Cl.
*F24F 11/63* (2018.01)
*E06B 9/32* (2006.01)
(Continued)

(52) U.S. Cl.
CPC ................ *F24F 11/63* (2018.01); *E06B 9/32* (2013.01); *G05D 3/105* (2013.01); *G05D 25/02* (2013.01);
(Continued)

(58) Field of Classification Search
CPC .......... G05D 3/105; G05D 25/02; E06B 9/32; E06B 2009/2417; F24F 11/63;
(Continued)

(56) References Cited

U.S. PATENT DOCUMENTS

| 7,184,860 B2 * | 2/2007 | Nakajima | ................ F24F 11/46 |
| | | | 702/182 |
| 11,060,351 B2 * | 7/2021 | Hebeisen | ................ F24F 11/62 |
| 11,746,594 B2 * | 9/2023 | Hebeisen | ............... H05B 47/11 |
| | | | 318/468 |
| 2010/0262293 A1 * | 10/2010 | Byberg | .................... E06B 9/68 |
| | | | 700/275 |

(Continued)

FOREIGN PATENT DOCUMENTS

| CN | 206977764 U | 2/2018 |
| EP | 0793158 A1 * | 9/1997 |

(Continued)

*Primary Examiner* — Chico A Foxx
*Assistant Examiner* — Ayodeji T Ojofeitimi
(74) *Attorney, Agent, or Firm* — Li & Cai Intellectual Property Office

(57) ABSTRACT

An intelligent control system for an electric curtain is provided. The intelligent control system includes a control apparatus, a monitoring apparatus, a sensing apparatus, a curtain apparatus, a lighting apparatus, and an air conditioning apparatus. The control apparatus is correspondingly coupled to the monitoring apparatus, the sensing apparatus, the curtain apparatus, the lighting apparatus, and the air conditioning apparatus. The monitoring apparatus is able to capture interior images, the sensing apparatus is able to sense exterior illuminance, and the control apparatus is configured to determine an opening degree of the curtain apparatus, illumination brightness of the lighting apparatus, and an air conditioning setting of the air conditioning apparatus by comparing different interior illuminance values, which are obtained from the interior images captured by the monitoring apparatus at different levels of interior illuminance, with an exterior illuminance value sensed by the sensing apparatus.

12 Claims, 11 Drawing Sheets

(51) Int. Cl.
    *G05D 3/10*     (2006.01)
    *G05D 25/02*     (2006.01)
    *E06B 9/24*     (2006.01)
    *F24F 110/12*     (2018.01)
    *F24F 110/22*     (2018.01)
    *F24F 130/10*     (2018.01)
    *F24F 130/20*     (2018.01)
    *G05B 1/03*     (2006.01)
    *G05B 13/00*     (2006.01)

(52) U.S. Cl.
    CPC ... *E06B 2009/2417* (2013.01); *F24F 2110/12* (2018.01); *F24F 2110/22* (2018.01); *F24F 2130/10* (2018.01); *F24F 2130/20* (2018.01); *G05B 1/03* (2013.01); *G05B 13/00* (2013.01); *G05B 2219/2642* (2013.01)

(58) Field of Classification Search
    CPC .............. F24F 2130/20; F24F 2110/22; F24F 2130/10; F24F 2110/12; G05B 1/03; G05B 13/00; G05B 2219/2642
    USPC ......................................................... 700/237
    See application file for complete search history.

(56) References Cited

U.S. PATENT DOCUMENTS

| | | | |
|---|---|---|---|
| 2013/0173062 A1* | 7/2013 | Koenig-Richardson | H04L 12/2827 700/275 |
| 2014/0156079 A1* | 6/2014 | Courtney | E06B 9/68 700/275 |
| 2014/0209254 A1* | 7/2014 | Birru | E06B 9/68 160/5 |
| 2014/0225512 A1* | 8/2014 | Birru | E06B 9/32 315/151 |
| 2018/0252035 A1* | 9/2018 | Casey | E06B 9/68 |
| 2020/0217132 A1* | 7/2020 | Chang | G05B 15/02 |
| 2020/0379422 A1* | 12/2020 | Courtney | E06B 9/32 |
| 2021/0277714 A1* | 9/2021 | Hebeisen | E06B 9/68 |
| 2022/0128206 A1* | 4/2022 | Weitlaner | H05B 47/125 |

FOREIGN PATENT DOCUMENTS

| | | | | |
|---|---|---|---|---|
| EP | 3339988 A1 | * | 6/2018 | ........... E04D 13/033 |
| EP | 2417320 B1 | * | 7/2018 | ............ E06B 9/322 |
| TW | I665539 B | | 7/2019 | |
| WO | WO-2020021347 A1 | * | 1/2020 | .............. E06B 9/24 |

* cited by examiner

INTELLIGENT CONTROL SYSTEM FOR ELECTRIC CURTAIN

CROSS-REFERENCE TO RELATED PATENT APPLICATION

This application claims the benefit of priority to Taiwan Patent Application No. 110101218, filed on Jan. 13, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a control system, and more particularly to an intelligent control system for an electric curtain.

BACKGROUND OF THE DISCLOSURE

With the advancement of technology and the improvement of living standards, electric smart curtains have emerged in response to demands for smart homes. However, the opening and closing of conventional smart curtains are usually controlled through a remote control. Such a control manner is unimodal and straightforward, and is hardly able to meet requirements for smart homes. Therefore, the smart curtain is used in cooperation with an interior illuminance meter for obtaining interior illuminance through the interior illuminance meter, so as to control the opening and closing of the curtain. However, the smart curtain with the interior illuminance meter only adopts certain lighting points, and can easily be affected by sunlight, light fixtures and nearby lighting, thereby resulting in control instability and other problems. As such, there is still room for improvement in terms of user experience for the conventional smart curtain.

SUMMARY OF THE DISCLOSURE

In response to the above-referenced technical inadequacies, the present disclosure provides an intelligent control system for an electric curtain.

In one aspect, the present disclosure provides an intelligent control system for an electric curtain, which includes a control apparatus, a monitoring apparatus, a sensing apparatus, a curtain apparatus, a lighting apparatus, and an air conditioning apparatus. The control apparatus is correspondingly coupled to the monitoring apparatus, the sensing apparatus, the curtain apparatus, the lighting apparatus, and the air conditioning apparatus. The monitoring apparatus is able to capture interior images, the sensing apparatus is able to sense exterior illuminance, and the control apparatus is configured to determine an opening degree of the curtain apparatus, illumination brightness of the lighting apparatus, and an air conditioning setting of the air conditioning apparatus by comparing different interior illuminance values, which are obtained from the interior images captured by the monitoring apparatus at different levels of interior illuminance, with an exterior illuminance value sensed by the sensing apparatus.

In certain embodiments, the monitoring apparatus is a camera coupled to the control apparatus.

In certain embodiments, the sensing apparatus includes an exterior illuminance sensor coupled to the control apparatus.

In certain embodiments, the sensing apparatus further includes an exterior temperature and humidity sensor, a wind speed and direction detector, a rain gauge, an interior temperature and humidity sensor, and a power detector correspondingly coupled to the control apparatus.

In certain embodiments, the control apparatus is configured to obtain a sunlight direction based on the interior images captured by the monitoring apparatus in situations where different sunlight shadows are cast according to different sunlight directions, and the control apparatus is configured to obtain position of the sun by obtaining solar coordinates of a current location, so as to determine the opening degree of the curtain apparatus, the illumination brightness of the lighting apparatus, and the air conditioning setting of the air conditioning apparatus based on the sunlight direction and the position of the sun.

In certain embodiments, the control apparatus includes a central processing unit, a data storage unit, and a communication unit, and the central processing unit is correspondingly coupled to the application interface, the data storage unit, and the communication unit.

In certain embodiments, the application interface includes a graphic analysis interface, and the graphic analysis interface further includes a user setting module, an analysis module, and a storage and output module. The user setting module is configured to enable user settings, the analysis module is configured to perform the graphical analysis, and the storage and output module is configured to store and output analysis results.

In certain embodiments, the application interface further includes a human-machine interface, and the human-machine interface further includes a user interface setting module, a control module, and a recording and output module. The user interface setting module is configured to enable interface settings, the control module is configured to perform custom process control, automatic scheduling control, and automatic sun tracking control, and the recording and output module is configured to generate and output records.

In certain embodiments, the control module includes a custom process control module, and the custom process control module includes a custom temperature control module configured to perform steps for custom control of temperature. The steps for custom control of temperature include obtaining sensing parameters, calculating an average value of the sensing parameters obtained over a period of time, which includes an average value of exterior temperature and humidity parameters and an average value of interior temperature and humidity parameters, obtaining a comparison result by comparing the average value of the exterior temperature and humidity parameters with the average value of the interior temperature and humidity parameters, introducing a comfort parameter, and determining the air conditioning setting and the opening degree of the curtain apparatus according to the comparison result and the comfort parameter.

In certain embodiments, the control module includes a custom process control module, and the custom process control module includes a custom energy saving control module configured to perform steps for custom control of energy saving. The steps for custom control of energy saving include obtaining sensing parameters, calculating an average value of the sensing parameters obtained over a period of time, which includes an average value of interior temperature and humidity, an average value of exterior temperature and humidity, an average value of interior illuminance, and an average value of exterior illuminance, obtaining a comparison result by comparing the average value of interior temperature and humidity, the average value of exterior temperature and humidity, the average value of interior illuminance, and the average value of exterior illuminance, and determining the air conditioning setting, the illumination brightness, and the opening degree of the curtain apparatus according to the comparison result.

In certain embodiments, the control module includes an automatic scheduling control module configured to perform steps for automatic time scheduling. The steps for automatic time scheduling include obtaining current time, checking scheduled time, and determining the opening degree of the curtain apparatus, the illumination brightness, and the air conditioning setting according to the scheduled time.

In certain embodiments, the control module includes an automatic sun tracking control module configured to perform steps for automatic tracking of the sun. The steps for the automatic sun tracking control include obtaining a sunlight direction, obtaining solar coordinates, obtaining sensing parameters, calculating an average value of the sensing parameters obtained over a period of time, which includes an average value of exterior illuminance and an average value of interior illuminance, obtaining a comparison result by comparing the average value of exterior illuminance with the average value of interior illuminance, introducing a comfort parameter, and determining the opening degree of the curtain apparatus, the illumination brightness, and the air conditioning setting according to the comparison result and the comfort parameter.

Therefore, in the intelligent control system for the electric curtain provided by the present disclosure, by virtue of "the monitoring apparatus being able to capture the interior images, the sensing apparatus being able to sense the exterior illuminance, and the control apparatus being configured to determine the opening degree of the curtain apparatus, the illumination brightness of the lighting apparatus, and the air conditioning setting of the air conditioning apparatus by comparing the different interior illuminance values obtained from the interior images captured by the monitoring apparatus at different interior illuminance with the exterior illuminance sensed by the sensing apparatus," the opening degree of the curtain apparatus, the illumination brightness of the lighting apparatus, and the air conditioning setting of the air conditioning apparatus can be intelligently controlled based on the interior illuminance and the exterior illuminance, so as to achieve an optimal intelligent control and further improve a user experience.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
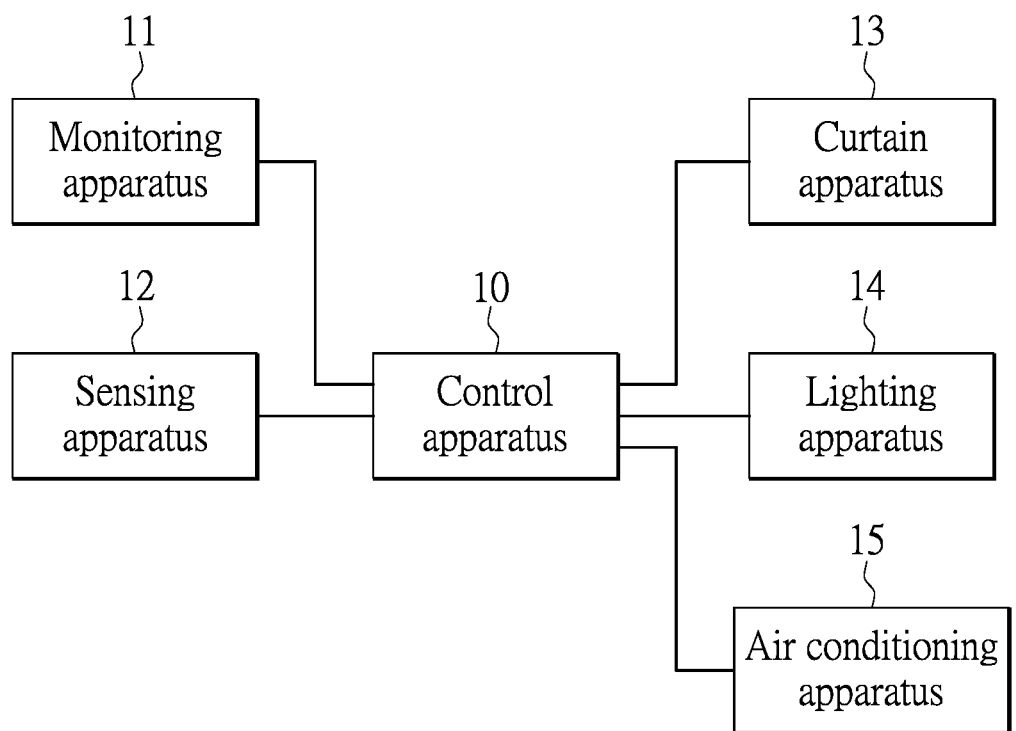
FIG. 1 is a system architecture diagram of an intelligent control system for an electric curtain according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Embodiments

Reference is made to FIG. 1, which is a system architecture diagram of an intelligent control system for an electric curtain of the present disclosure. As shown in FIG. 1, the intelligent control system for the electric curtain provided by the present disclosure includes a control apparatus 10, a monitoring apparatus 11, a sensing apparatus 12, a curtain apparatus 13, a lighting apparatus 14, and an air conditioning apparatus 15.

In the present embodiment, the monitoring apparatus 11 can be or includes a camera, and the camera can be a panoramic camera. In addition, the monitoring apparatus 11 can also be a closed-circuit television (CCTV) monitoring apparatus. Moreover, the monitoring apparatus 11 is able to capture interior images (e.g., images of an indoor space).

In the present embodiment, the sensing apparatus 12 can be or includes an exterior illuminance sensor. Moreover, the sensing apparatus 12 is able to sense exterior illuminance.

In the present embodiment, the control apparatus 10 can be a monitoring host, a control device, and a control box, but is not limited thereto. In addition, the control apparatus 10 is correspondingly coupled to the monitoring apparatus 11, the sensing apparatus 12, the curtain apparatus 13, the lighting apparatus 14, and the air conditioning apparatus 15.

Further, the control apparatus 10 of the present embodiment is configured to determine an opening degree of the curtain apparatus 13, illumination brightness of the lighting apparatus 14, and an air conditioning setting of the air conditioning apparatus 15 by comparing different interior illuminance values obtained from the interior images captured by the monitoring apparatus 11 at different levels of interior illuminance with the exterior illuminance sensed by the sensing apparatus 12.

Specifically, when the interior illuminance is low, the interior image captured by the monitoring apparatus 11 is a low illumination image. However, when the interior illuminance is high, the interior image captured by the monitoring apparatus 11 is a high illumination image, so that the control apparatus 10 is able to judge the interior illuminance based on the interior images captured by the monitoring apparatus 11 at the different levels of interior illuminance, thereby obtaining the different interior illuminance values. To be more specific, the control apparatus 10 is able to judge the interior illuminance based on an overall characteristic or a partial characteristic (e.g., a characteristic of one particular position) of the captured interior image.

Moreover, the control apparatus 10 is able to compare the interior illuminance value obtained with an exterior illuminance value. When the exterior illuminance value is low, the control apparatus 10 is able to increase the opening degree of the curtain apparatus 13. When the exterior illuminance value is high, the control apparatus 10 is able to decrease the opening degree of the curtain apparatus 13, so that interior apparatus can avoid excessive sunlight exposure. In addition, when the exterior illuminance value is high, the control apparatus 10 is able to turn on the air conditioning apparatus 15 for temperature regulation, and to reduce the illumination brightness of the lighting apparatus 14 for energy saving.

In addition, the monitoring apparatus 11 is able to captured interior images of shadow changes due to movement of the sun, so that the control apparatus 10 is able to obtain a sunlight direction based on the interior images captured by the monitoring apparatus 11 in situations where different sunlight directions cause different sunlight shadows. Furthermore, the control apparatus 10 can have a global positioning system (GPS) positioning function, and is also able to obtain data of solar coordinates of a current location through a built-in database or an internet, so as to obtain a position of the sun that corresponds to the current location. In this way, the control apparatus 10 can further determine the opening degree of the curtain apparatus 13, the illumination brightness of the lighting apparatus 14, and the air conditioning setting of the air conditioning apparatus 15 based on the sunlight direction and the position of the sun. For example, the control apparatus 10 can keep leaves of the curtain apparatus 13 and the sunlight direction perpendicular to each other.

Figure 2:
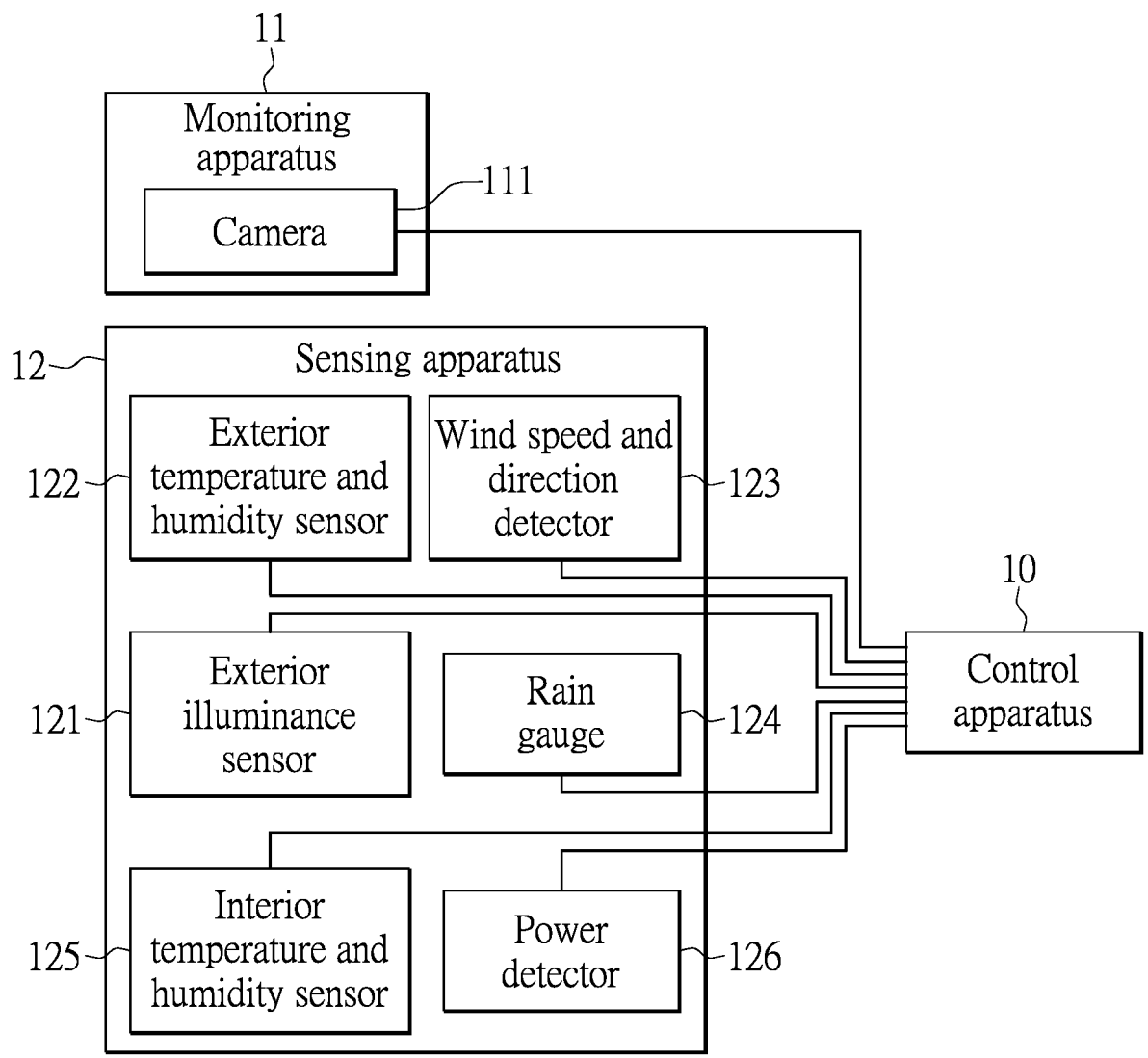
FIG. 2 is an architecture diagram of a monitoring apparatus and a sensing apparatus according to one embodiment of the present disclosure.

In an exemplary embodiment, with reference to FIG. 2, the monitoring apparatus 11 can include a camera 111 coupled to the control apparatus 10, and the camera 111 is able to capture images in a panoramic manner. The monitoring apparatus 11 can be coupled to the control apparatus 10 in a wireless or a wired manner, but is not limited thereto.

Further, as shown in FIG. 2, the sensing apparatus 12 can include an exterior illuminance sensor 121, an exterior temperature and humidity sensor 122, a wind speed and direction detector 123, a rain gauge 124, an interior temperature and humidity sensor 125, and a power detector 126 correspondingly coupled to the control apparatus 10. The sensing apparatus 12 can be coupled to the control apparatus 10 in a wireless or a wired manner, but is not limited thereto. In addition, a specific configuration and a quantity of each of the sensors/detectors included in the sensing apparatus 12 can be adjusted according to actual requirements.

Figure 3:
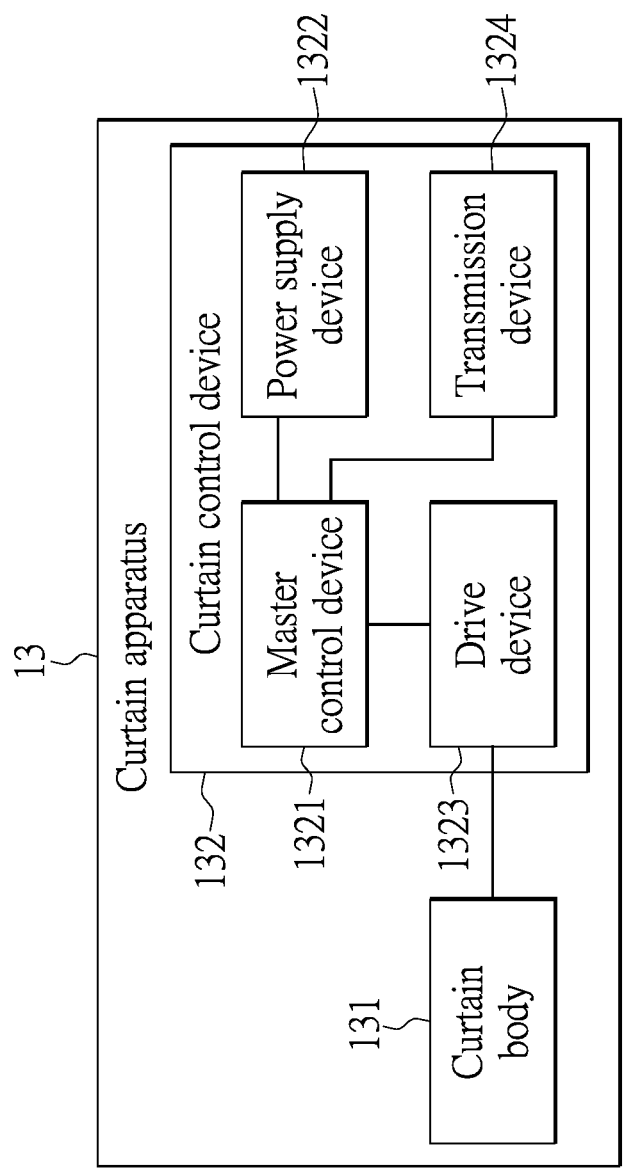
FIG. 3 is an architecture diagram of a curtain apparatus according to one embodiment of the present disclosure.

In an exemplary embodiment, which is to be read in conjunction with FIG. 3, the curtain apparatus 13 can include a curtain body 131 and a curtain control device 132 coupled to the curtain body 131. The curtain body 131 can be, for example, a venetian blind. The curtain control device 132 can include a master control device 1321, a power supply device 1322 coupled to the master control device 1321, a drive device 1323 coupled to the master control device 1321, and a transmission device 1324 coupled to the master control device 1321.

Figure 4:
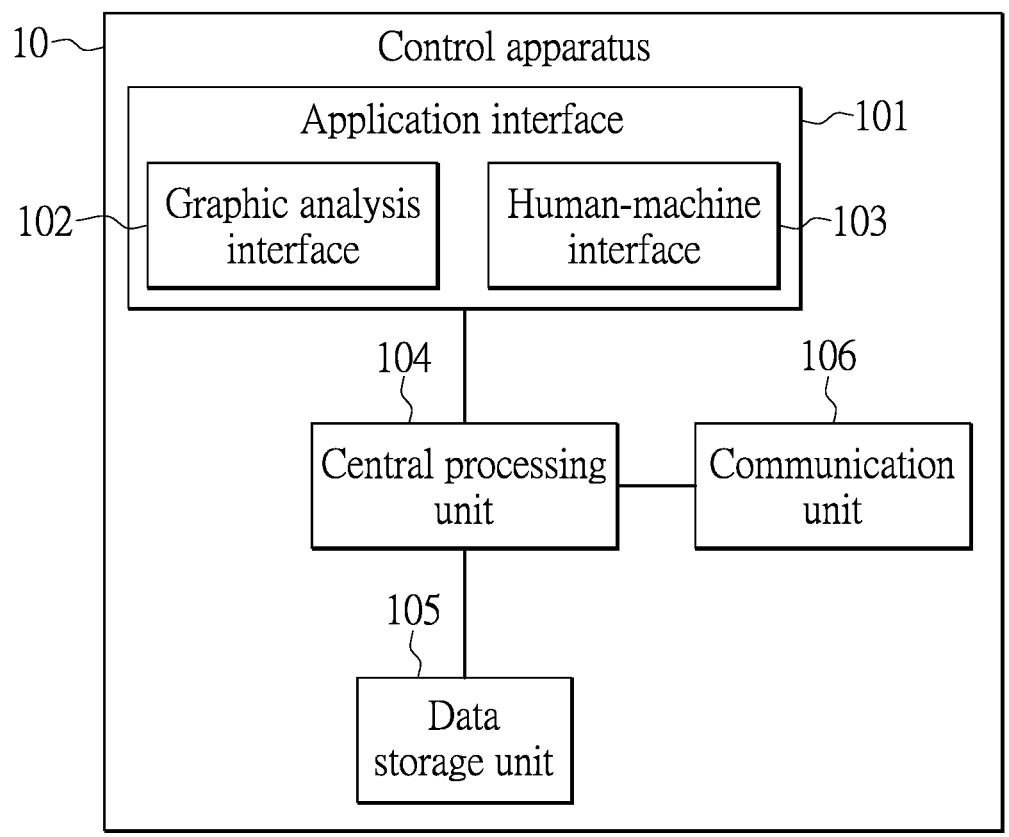
FIG. 4 is an architecture diagram of a control apparatus according to one embodiment of the present disclosure.

In an exemplary embodiment, with reference to FIG. 4, the control apparatus 10 can include an application interface 101, a central processing unit 104, a data storage unit 105, and a communication unit 106. The central processing unit 104 is correspondingly coupled to the application interface 101, the data storage unit 105, and the communication unit 106. Further, the application interface 101 can be an interface formed by integration of hardware and software (such as a liquid crystal display and a touch screen), and can be an interactive interface. In addition, the application interface 101 and buttons thereof can be physical or virtual, and the exemplary embodiments described are only for the purposes of illustration and are not intended to limit the present disclosure.

Figure 5:
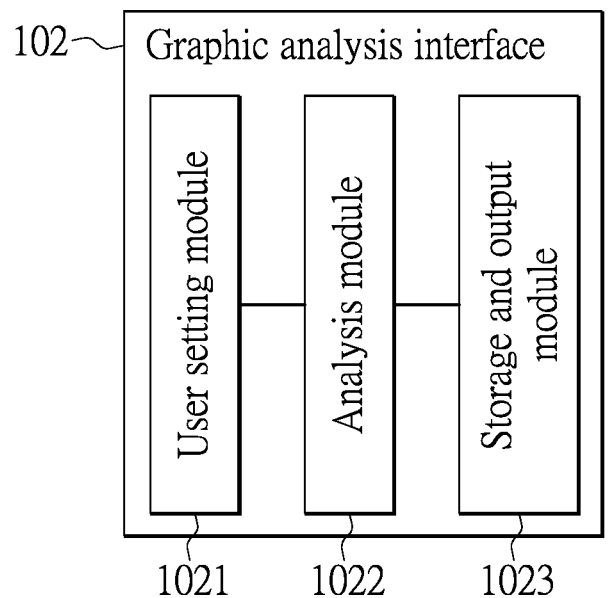
FIG. 5 is an architecture diagram of a graphic analysis interface according to one embodiment of the present disclosure.

In the present embodiment, the application interface 101 can include or be divided into a graphical analysis interface 102 and a human-machine interface 103. In an exemplary embodiment, with reference to FIG. 5, the graphic analysis interface 102 further includes a user setting module 1021, an analysis module 1022, and a storage and output module 1023. The user setting module 1021 is configured for user settings, such as graphic selection, alarm settings, auxiliary environment scanning settings, and distance correction settings, but is not limited thereto and can be adjusted according to the actual requirements. The analysis module 1022 is configured to perform graphical analysis, such as identifying the sunlight direction based on the interior images captured by the monitoring apparatus 11 in the situations where the different sunlight directions cause the different sunlight shadows, calculating illuminance of an area based on the overall characteristic or the partial characteristic of the interior images, and calculating a distance with respect to an object or of the area based on the overall characteristic or the partial characteristic of the interior images, but is not limited thereto and can be adjusted according to the actual requirements. The storage and output module 1023 is configured to store and output analysis results, such as storage of alarm images and output of analysis calculations and records, but is not limited thereto and can be adjusted according to the actual requirements. The modules of the graphic analysis interface 102 described above can be software modules executed by a central processor. In certain embodiments, the modules of the graphic analysis interface 102 can also be hardware modules of an integrated circuit (IC).

Figure 6:
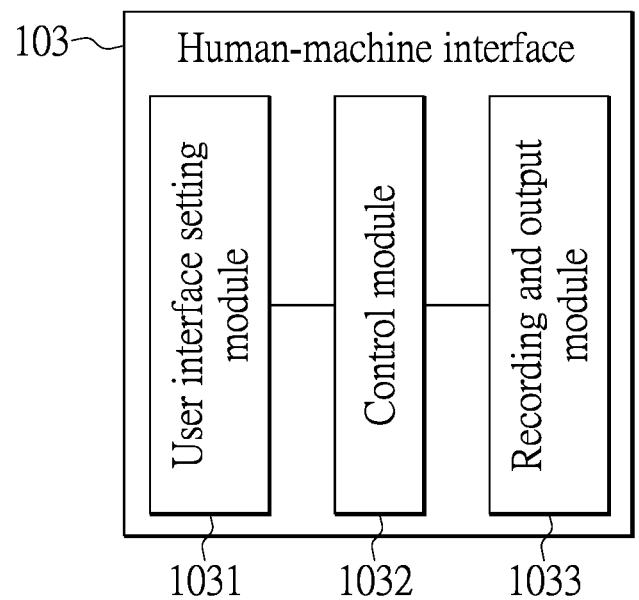
FIG. 6 is an architecture diagram of a human-machine interface according to one embodiment of the present disclosure.

In an exemplary embodiment, with reference to FIG. 6, the human-machine interface 103 further includes a user interface setting module 1031, a control module 1032, and a recording and output module 1033. The user interface setting module 1031 is configured for user interface settings, such as page editing, communication settings, device settings, permission settings, and alarm settings, but is not limited thereto and can be adjusted according to the actual requirements. The control module 1032 is configured to perform custom process control, automatic scheduling control, and automatic sun tracking control, but is not limited thereto and can be adjusted according to the actual requirements. The recording and output module 1033 is configured to generate and output records, such as generation of programming records, status records, communication records, and trend records and output of reports, but is not limited thereto and can be adjusted according to the actual requirements. The modules of the human-machine interface 103 described above can be software modules executed by the central processor. In certain embodiments, the modules of the human-machine interface 103 can also be hardware modules of the IC.

Figure 7:
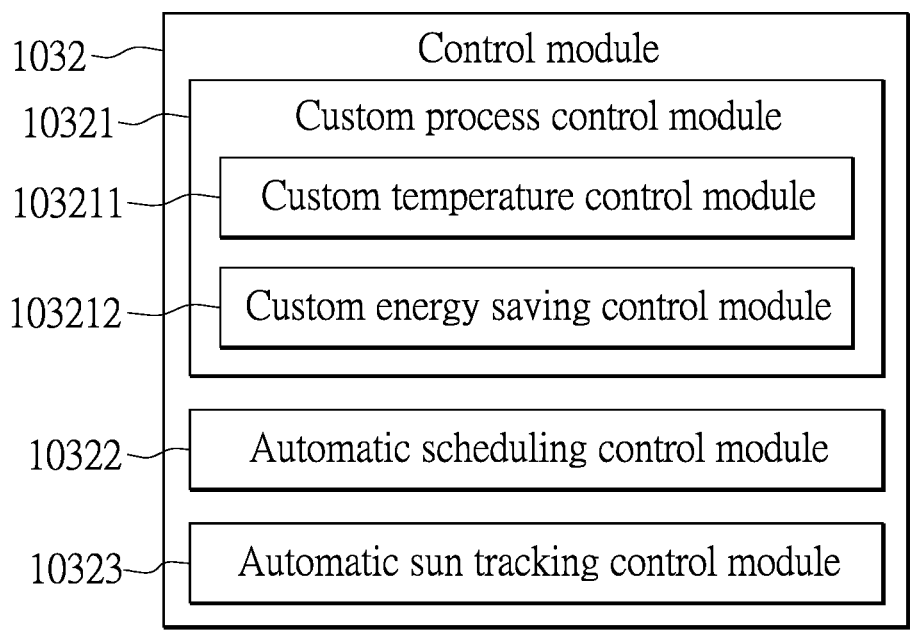
FIG. 7 is an architecture diagram of a control module according to one embodiment of the present disclosure.
Figure 8:
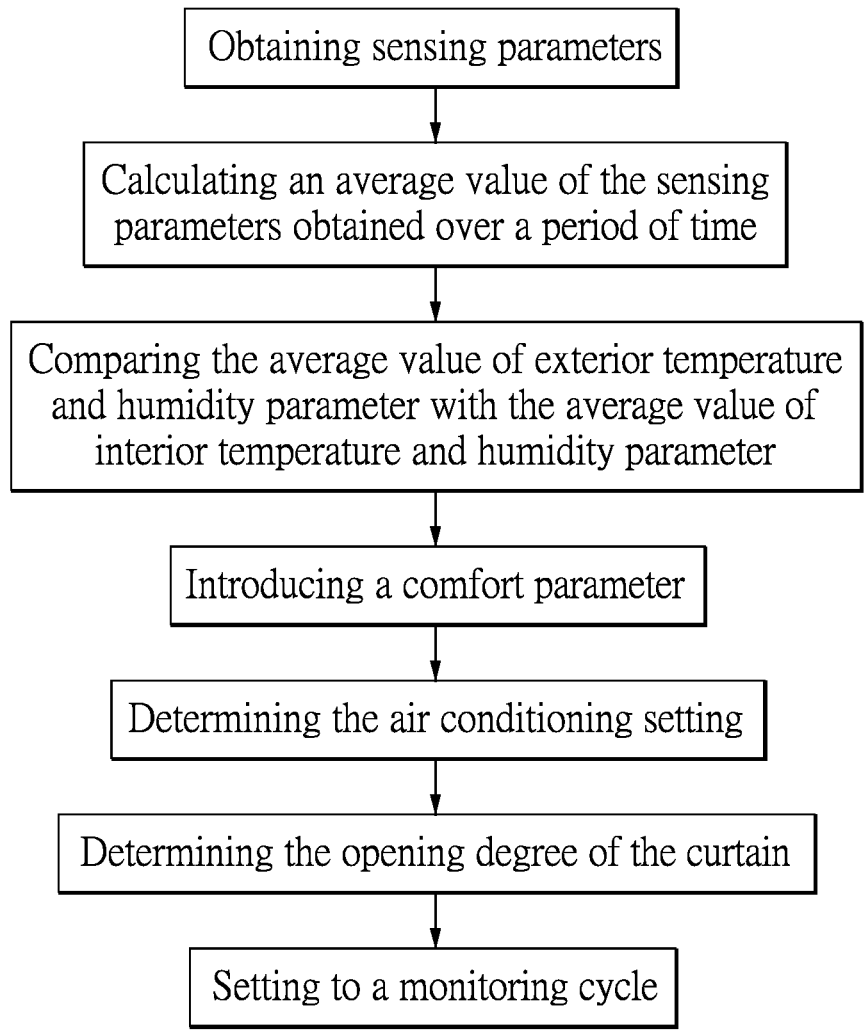
FIG. 8 is a flow chart illustrating custom temperature control according to one embodiment of the present disclosure.

Further, as shown in FIG. 7, the control module 1032 includes a custom process control module 10321, and the custom process control module 10321 further includes a custom temperature control module 103211 and a custom energy saving control module 103212. The custom temperature control module 103211 is configured to perform steps for custom control of temperature. More specifically, as shown in FIG. 8, the steps for custom control of temperature include: (a) obtaining sensing parameters that can be obtained by each of the sensors/detectors of the sensing apparatus 12; (b) calculating an average value of the sensing parameters obtained over a period of time, which includes an average value of exterior temperature and humidity parameters and an average value of interior temperature and humidity parameters, so as to avoid influence of extreme values; (c) obtaining a comparison result by comparing the average value of exterior temperature and humidity parameter with the average value of interior temperature and humidity parameter; (d) introducing a comfort parameter if the user has set the comfort parameter based on personal preference (e.g., a temperature and humidity value or a light intensity preferred by those with high body temperature or with low body temperature); (e) determining the air conditioning setting and the opening degree of the curtain according to the comparison result and the comfort parameter; and (f) optionally setting to a monitoring cycle. Therefore, through the control apparatus 10 having a custom temperature control function, a personalized temperature control and an optimal temperature control can be achieved.

Figure 9:
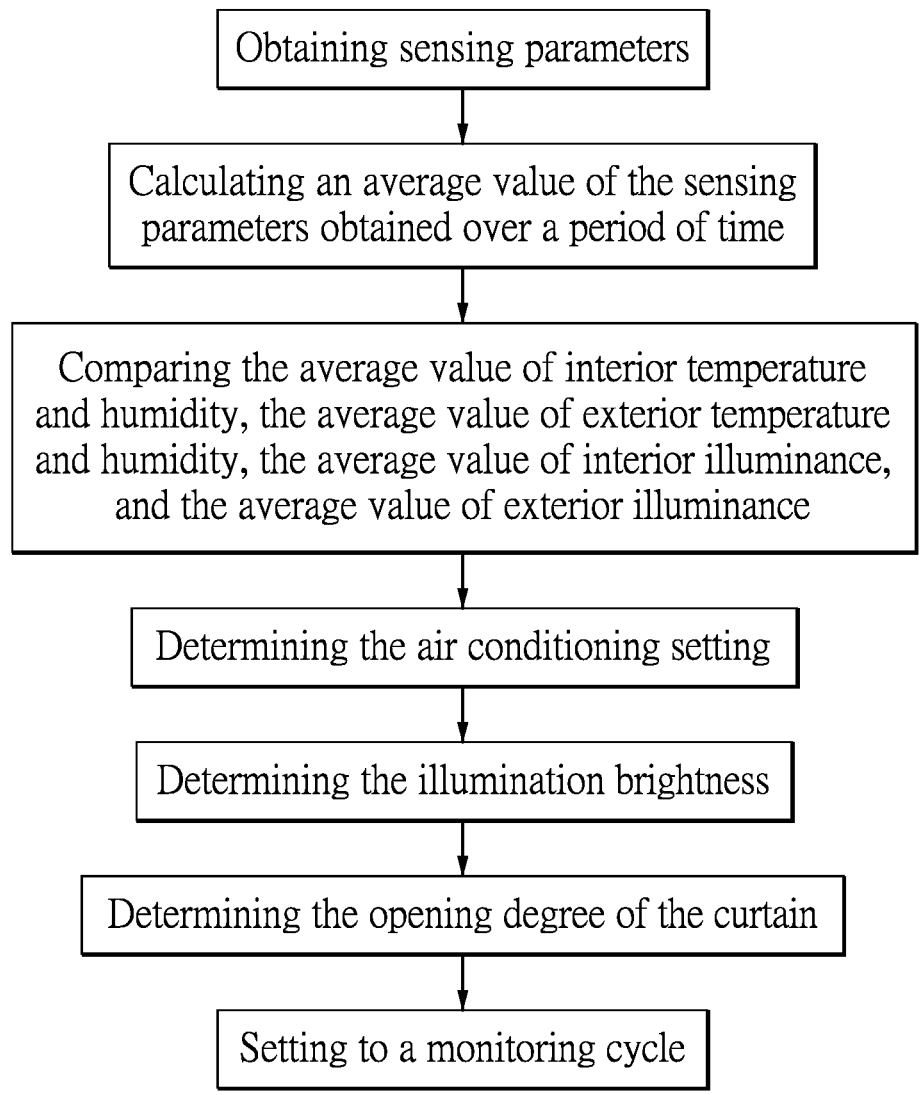
FIG. 9 is a flow chart illustrating custom energy saving control according to one embodiment of the present disclosure.

As shown in FIG. 7, the custom process control module 10321 can include the custom energy saving control module 103212. The custom energy saving control module 103212 is configured to perform steps for custom control of energy saving. More specifically, as shown in FIG. 9, the steps for custom control of energy saving include: (a) obtaining sensing parameters that can be obtained by each of the sensors/detectors of the sensing apparatus 12; (b) calculating an average value of the sensing parameters obtained over a period of time, which includes an average value of interior temperature and humidity, an average value of exterior temperature and humidity, an average value of interior illuminance, and an average value of exterior illuminance, so as to avoid influence of extreme values; (c) obtaining a comparison result by comparing the average value of interior temperature and humidity, the average value of exterior temperature and humidity, the average value of interior illuminance, and the average value of exterior illuminance; (d) determining the air conditioning setting, the illumination brightness, and the opening degree of the curtain according to the comparison result; and (e) optionally setting to a monitoring cycle. Therefore, through the control apparatus 10 having a custom energy saving control function, an optimal energy saving control can be achieved.

Figure 10:
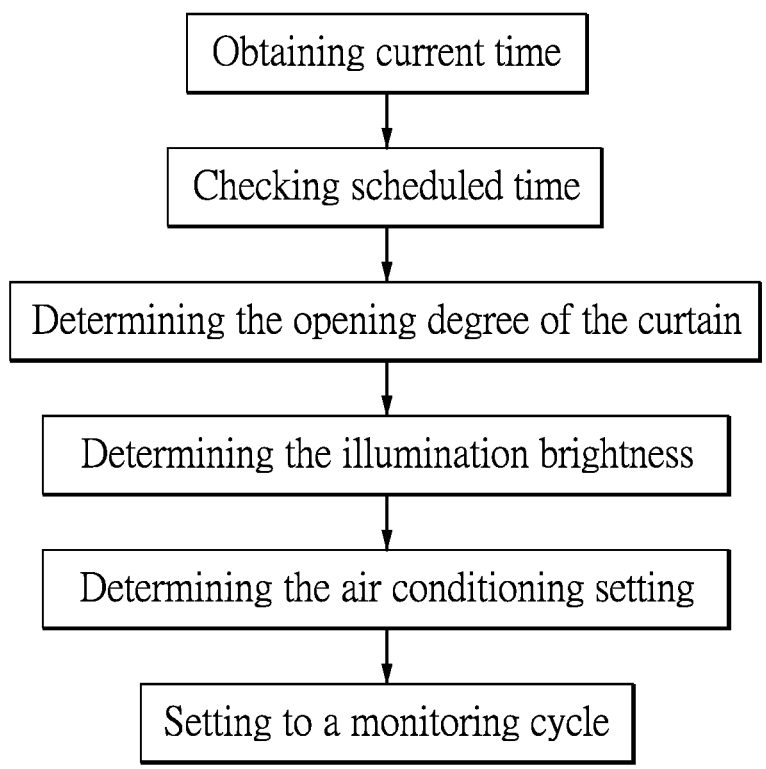
FIG. 10 is a flow chart illustrating automatic scheduling control according to one embodiment of the present disclosure.

In addition, as shown in FIG. 7, the control module 1032 also includes an automatic scheduling control module 10322. The automatic scheduling control module 10322 is configured to perform steps for automatic time scheduling. More specifically, as shown in FIG. 10, the steps for automatic time scheduling include: (a) obtaining current time; (b) checking scheduled time; (c) determining the opening degree of the curtain, the illumination brightness, and the air conditioning setting according to the scheduled time (e.g., morning, noon, night or different time periods of a day); and (d) optionally setting to a monitoring cycle. Therefore, through the control apparatus 10 having an automatic scheduling control function, an optimal scheduling control can be achieved.

Figure 11:
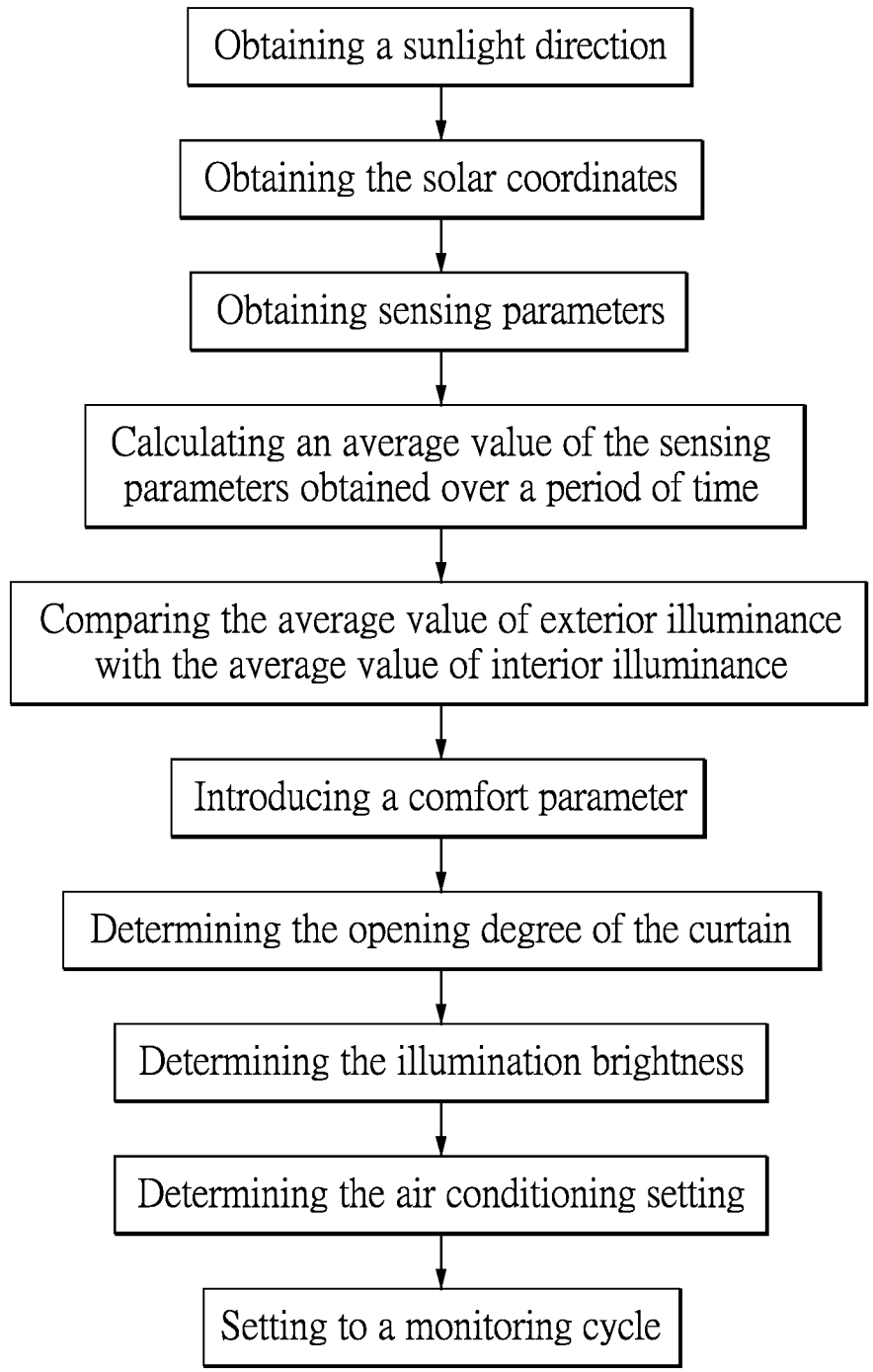
FIG. 11 is a flow chart illustrating automatic sun tracking control according to one embodiment of the present disclosure.

Furthermore, as shown in FIG. 7, the control module 1032 also includes an automatic sun tracking control module 10323. The automatic sun tracking control module 10323 is configured to perform steps for automatic tracking the sun. More specifically, as shown in FIG. 11, the steps for automatic tracking the sun include: (a) obtaining the sunlight direction, which can be identified by the interior images captured by the monitoring apparatus 11 in situations of different sunlight shadows; (b) obtaining the solar coordinates, which can be obtained through the database or the internet and can serve as supplementary information; (c) obtaining sensing parameters that can be obtained by each of the sensors/detectors of the sensing apparatus 12; (d) calculating an average value of the sensing parameters obtained over a period of time, which includes an average value of exterior illuminance and an average value of interior illuminance, so as to avoid influence of extreme values; (e) obtaining a comparison result by comparing the average value of exterior illuminance with the average value of interior illuminance; (f) introducing a comfort parameter if the user has set the comfort parameter based on personal preference (e.g., a temperature and humidity value or a light intensity preferred by those with high body temperature or with low body temperature); (g) determining the opening degree of the curtain, the illumination brightness, and the air conditioning setting according to the comparison result and the comfort parameter; and (h) optionally setting to a monitoring cycle. Therefore, through the control apparatus 10 having an automatic sun tracking control function, the opening degree of the curtain, the illumination brightness, and the air conditioning setting can be intelligently controlled based on the interior illuminance and the exterior illuminance, so that an optimal intelligent control can be achieved.

Figure 12:
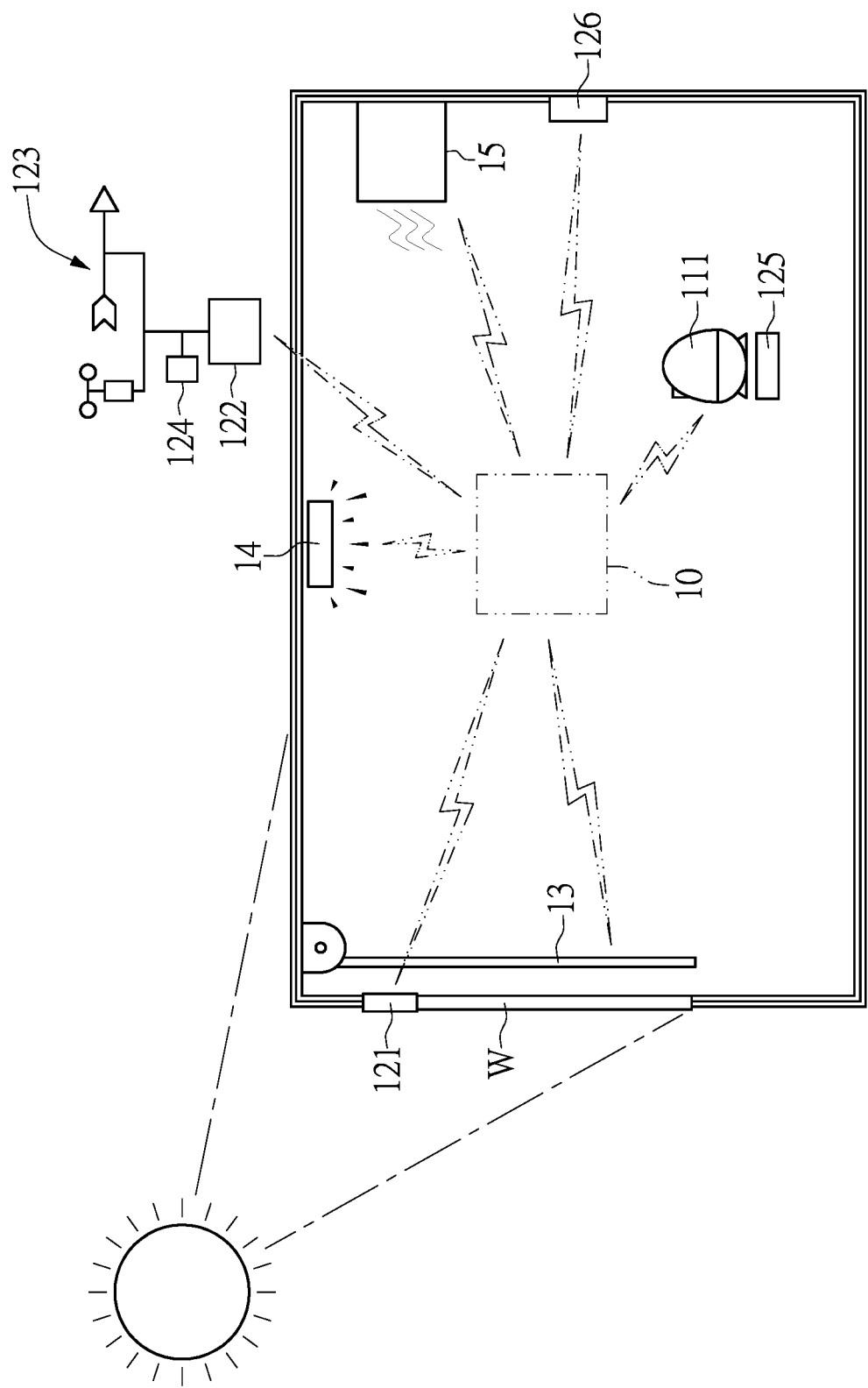
FIG. 12 is a schematic view showing one configuration of the intelligent control system for the electric curtain according to the present disclosure.

Reference is made to FIG. 12, which is a schematic view of an intelligent control system for an electric curtain according to one embodiment of the present disclosure. As shown in FIG. 12, the intelligent control system for the electric curtain exemplarily includes the camera 111 arranged in a room, the exterior illuminance sensor 121 arranged on a window W, the wind speed and direction detector 123 arranged outdoor, the rain gauge 124 arranged outdoor, the interior temperature and humidity sensor 125 arranged in the room, the power detector 126 arranged in the room, the curtain apparatus 13 arranged adjacent to the window W, the lighting apparatus 14 arranged in the room, and the air conditioning apparatus 15 arranged in the room. It should be noted that, the intelligent control system for the electric curtain of the present disclosure is not limited to the configuration shown in FIG. 12, and can be adjusted according to the actual requirements.

Beneficial Effects of the Embodiments

In conclusion, in the intelligent control system for the electric curtain provided by the present disclosure, by virtue of "the monitoring apparatus 11 being able to capture the interior images, the sensing apparatus 12 being able to sense the exterior illuminance, and the control apparatus 10 being configured to determine the opening degree of the curtain apparatus 13, the illumination brightness of the lighting apparatus 14, and the air conditioning setting of the air conditioning apparatus 15 by comparing the different interior illuminance values obtained from the interior images captured by the monitoring apparatus 11 at different interior illuminance with the exterior illuminance sensed by the sensing apparatus 12," the opening degree of the curtain apparatus, the illumination brightness of the lighting apparatus, and the air conditioning setting of the air conditioning apparatus can be intelligently controlled based on the interior illuminance and the exterior illuminance, so as to achieve the optimal intelligent control and further improve a user experience.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An intelligent control system for an electric curtain, comprising:
a control apparatus;
a monitoring apparatus;
a sensing apparatus;
a curtain apparatus;
a lighting apparatus; and
an air conditioning apparatus;
wherein the control apparatus is correspondingly coupled to the monitoring apparatus, the sensing apparatus, the curtain apparatus, the lighting apparatus, and the air conditioning apparatus;
wherein the monitoring apparatus is able to capture interior images, the sensing apparatus is able to sense exterior illuminance, and the control apparatus is configured to determine an opening degree of the curtain apparatus, illumination brightness of the lighting apparatus, and an air conditioning setting of the air conditioning apparatus by comparing different interior illuminance values, which are obtained from the interior images captured by the monitoring apparatus at different levels of interior illuminance, with an exterior illuminance value sensed by the sensing apparatus;
wherein the control apparatus includes an application interface, the application interface includes a graphic analysis interface, and the graphic analysis interface further includes a user setting module, an analysis module, and a storage and output module;
wherein the analysis module is configured to perform graphical analysis, and is able to calculate an illuminance of an area based on overall or partial characteristics of the interior images.

2. The intelligent control system according to claim 1, wherein the monitoring apparatus is a camera coupled to the control apparatus.

3. The intelligent control system according to claim 1, wherein the sensing apparatus includes an exterior illuminance sensor coupled to the control apparatus.

4. The intelligent control system according to claim 3, wherein the sensing apparatus further includes an exterior temperature and humidity sensor, a wind speed and direction detector, a rain gauge, an interior temperature and humidity sensor, and a power detector correspondingly coupled to the control apparatus.

5. The intelligent control system according to claim 1, wherein the control apparatus is configured to obtain a sunlight direction based on the interior images captured by the monitoring apparatus in situations where different shadows are cast according to different sunlight directions; wherein the control apparatus is configured to obtain a position of the sun by obtaining solar coordinates of a current location, so as to determine the opening degree of the curtain apparatus, the illumination brightness of the lighting apparatus, and the air conditioning setting of the air conditioning apparatus based on the sunlight direction and the position of the sun.

6. The intelligent control system according to claim 1, wherein the control apparatus includes a central processing unit, a data storage unit, and a communication unit, and the central processing unit is correspondingly coupled to the application interface, the data storage unit, and the communication unit.

7. The intelligent control system according to claim 6, wherein the user setting module is configured to enable user settings, the storage and output module is configured to store and output analysis results, and the user setting module is configured to enable graphical selection.

8. The intelligent control system according to claim 7, wherein the application interface further includes a human-machine interface, and the human-machine interface further includes a user interface setting module, a control module, and a recording and output module; wherein the user interface setting module is configured to enable interface settings, the control module is configured to perform custom process control, automatic scheduling control, and automatic sun tracking control, and the recording and output module is configured to generate and output records.

9. The intelligent control system according to claim 8, wherein the control module includes a custom process control module, and the custom process control module includes a custom temperature control module configured to perform steps for custom control of temperature; wherein the steps for custom control of temperature include: obtaining sensing parameters; calculating an average value of the sensing parameters obtained over a period of time, which includes an average value of exterior temperature and humidity parameters and an average value of interior temperature and humidity parameters; obtaining a comparison result by comparing the average value of the exterior temperature and humidity parameters with the average value of the interior temperature and humidity parameters; introducing a comfort parameter; and determining the air conditioning setting and the opening degree of the curtain apparatus according to the comparison result and the comfort parameter.

10. The intelligent control system according to claim 8, wherein the control module includes a custom process control module, and the custom process control module includes a custom energy saving control module configured to perform steps for custom control of saving energy; wherein the steps for custom control of saving energy include: obtaining sensing parameters; calculating an average value of the sensing parameters obtained over a period of time, which includes an average value of interior temperature and humidity, an average value of exterior temperature and humidity, an average value of interior illuminance, and an average value of exterior illuminance; obtaining a comparison result by comparing the average value of interior temperature and humidity, the average value of exterior temperature and humidity, the average value of interior illuminance, and the average value of exterior illuminance; and determining the air conditioning setting, the illumination brightness, and the opening degree of the curtain apparatus according to the comparison result.

11. The intelligent control system according to claim 8, wherein the control module includes an automatic scheduling control module configured to perform steps for automatic time scheduling; wherein the steps for automatic time scheduling include: obtaining current time; checking scheduled time; and determining the opening degree of the curtain apparatus, the illumination brightness, and the air conditioning setting according to the scheduled time.

12. The intelligent control system according to claim 8, wherein the control module includes an automatic sun tracking control module configured to perform steps for automatically tracking the sun; wherein the steps for automatically tracking the sun include: obtaining a sunlight direction; obtaining solar coordinates; obtaining sensing parameters; calculating an average value of the sensing parameters obtained over a period of time, which includes an average value of exterior illuminance and an average value of interior illuminance; obtaining a comparison result by comparing the average value of exterior illuminance with the average value of interior illuminance; introducing a comfort parameter; and determining the opening degree of the curtain apparatus, the illumination brightness, and the air conditioning setting according to the comparison result and the comfort parameter.

* * * * *